United States Patent
Schat

(10) Patent No.: US 10,648,889 B2
(45) Date of Patent: May 12, 2020

(54) MONITOR SYSTEM FOR DETECTING DEFEAT DEVICES IN ENGINE CONTROL UNITS

(71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 217 days.

(21) Appl. No.: 15/967,376

(22) Filed: Apr. 30, 2018

(65) Prior Publication Data
US 2019/0331555 A1    Oct. 31, 2019

(51) Int. Cl.
G01M 15/04 (2006.01)
G01M 17/007 (2006.01)
G01M 13/00 (2019.01)
G01M 15/02 (2006.01)

(52) U.S. Cl.
CPC ........ *G01M 17/0072* (2013.01); *G01M 13/00* (2013.01); *G01M 15/02* (2013.01)

(58) Field of Classification Search
CPC ..... G01M 15/04; G01M 15/042; G01M 15/05
USPC ................ 73/114.58, 114.61, 114.69, 114.71
See application file for complete search history.

(56) References Cited

U.S. PATENT DOCUMENTS

| | | | |
|---|---|---|---|
| 5,896,083 A | 4/1999 | Weisman, II et al. | |
| 6,573,827 B1 | 6/2003 | McKenzie | |
| 6,678,606 B2 | 1/2004 | Akins et al. | |
| 8,635,117 B1 | 1/2014 | Acuña-Rohter | |
| 2003/0036836 A1 | 2/2003 | Miller | |
| 2005/0122965 A1 | 6/2005 | Heinla et al. | |
| 2009/0195368 A1 | 8/2009 | Kumik et al. | |
| 2011/0047044 A1 | 2/2011 | Wright et al. | |
| 2013/0024066 A1 | 1/2013 | Geilen et al. | |
| 2013/0116881 A1* | 5/2013 | Bogema | F01N 3/2066 701/29.2 |
| 2018/0171922 A1* | 6/2018 | Noh | F02D 41/22 |

OTHER PUBLICATIONS

B. Snavely et al., "How Fiat Chrysler's diesel woes differ from VW's," Detroit Free Press, Jan. 13, 2017; 2 pages.
C. Ebert et al., "Embedded Software: Facts, Figures, and Future," Embedded Software, IEEE Computer Society, Apr. 2009, pp. 42-52; 11pages.
I. Mukhopadhyay, "Heuristic Intrusion Detection and Prevention System," IEEE 2015; 7 pages.

(Continued)

*Primary Examiner* — Eric S. McCall

(57) ABSTRACT

A method for detecting defeat devices in an engine control unit (ECU) includes storing with a key-data collection unit, a first key-data determined during an environmental test of a vehicle. The key-data collection unit stores a second key-data determined before the environmental test. Wherein, one of the first key-data is determined by the ECU modified by a characteristic only present before the environmental test and the second key-data is determined by the ECU modified by a characteristic only present during the environmental test. An environmental testing device compares the first key-data with the second key-data to detect an anomaly, wherein the anomaly indicates the presence of the defeat device in the ECU.

20 Claims, 6 Drawing Sheets

(56) References Cited

OTHER PUBLICATIONS

J. Ewing et al., "Volkswagen to Stop Sales of Diesel Cars Involved in Recall," The New York Times, Sep. 21, 2015, p. B1; 5 pages.
M. Contag et al., "How They Did It: An Analysis of Emission Defeat Devices in Modern Automobiles," IEEE Security and Privacy 2017 conference; 20 pages.
Q. Schiermeier, "The science behind the Volkswagen emissions scandal," Nature, Macmillan Publishers Ltd., Sep. 24, 2015 ; 5 pages.
R. N. Charette, "This Car Runs on Code," IEEE, Green Tech // Advanced Cars, Feb. 2009; 6 pages.
X. Mingfu et al., "Detecting Hardware Trojan Through Heuristic Partition and Activity Driven Test Pattern Generation," 2014 Communications Security Conference (CSC 2014), May 22-24, 2014, Beijing China; 6 pages.
Goodwill, Robert, "Vehicle Emissions Testing Programme Moving Britain Ahead", Apr. 22, 2016, retrieved from the internet at https://assets.publishing.service.gov.uk/government/uploads/system/uploads/attachment_data/file/548148/vehicle-emissions-testing-programme-web.pdf on Jan. 10, 2020.
Contag et al., "How They Did It: An Analysis of Emission Defeat Devices in Modern Automobiles", 2017 IEEE Symposium on Security and Provacy, May 22, 2017, pp. 231-250, IEEE.
European Commission, "Guidance on the evaluation of Auxiliary Emission Strategies with regard to the application of Regulation (EC) No. 715/2007 on type approval of motor vehicles with respect to emissions from light passenger and commercial vehicles (Euro 5 and Euro 6)", Commission Notice, Jan. 26, 2017, retrieved from the internet at https://ec.europa.eu.docsroom/documents/26183 on Jan. 10, 2020.
Tang et al., "A Simple Test Method to Monitor Emission Control Operating State Space (Emission Control Failure & Defeat Device Recognition)", SAE Technical Paper Series, Oct. 17, 2016, pp. 1-7, vol. 1, SAE International, Warrendale, PA, USA.

\* cited by examiner

MONITOR SYSTEM FOR DETECTING DEFEAT DEVICES IN ENGINE CONTROL UNITS

FIELD

This disclosure relates generally to environmental testing of vehicles, and more specifically to detecting defeat devices used to manipulate the results obtained by an environmental test.

BACKGROUND

Emission control testing of automobiles, and similar vehicles, has come under increased scrutiny due to the discovery that the Engine Control Unit (ECU) of certain automobiles was altered to circumvent tests designed to ensure clean engine emissions. In certain cases, a defeat device had been used to change a vehicle's performance during testing to be different than when the vehicle was used in "real-world" conditions (e.g., the intended daily usage pattern of the end consumer of the vehicle).

A defeat device is an auxiliary emission control device that reduces the effectiveness of the emission control system under conditions, which may reasonably be expected to be encountered in normal vehicle operation. The use of defeat devices has resulted in substantial fines to car manufacturers, exceeding a billion dollars in addition to a loss in consumer confidence. Hence, there is a significant economic incentive for car manufacturers to prevent and deter the use of defeat devices by their suppliers, and various departments of the car manufacturer itself.

Conversely, the pressure to use defeat devices is very high, because in many cases, the cars could only pass environmental acceptance and/or on-going period tests when the defeat devices were used. It is in the interest of car manufacturers to enable certification authorities to detect these defeat devices in a manner that restores consumer confidence, and continues to remain effective while defeat devices adapt in methods and sophistication.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
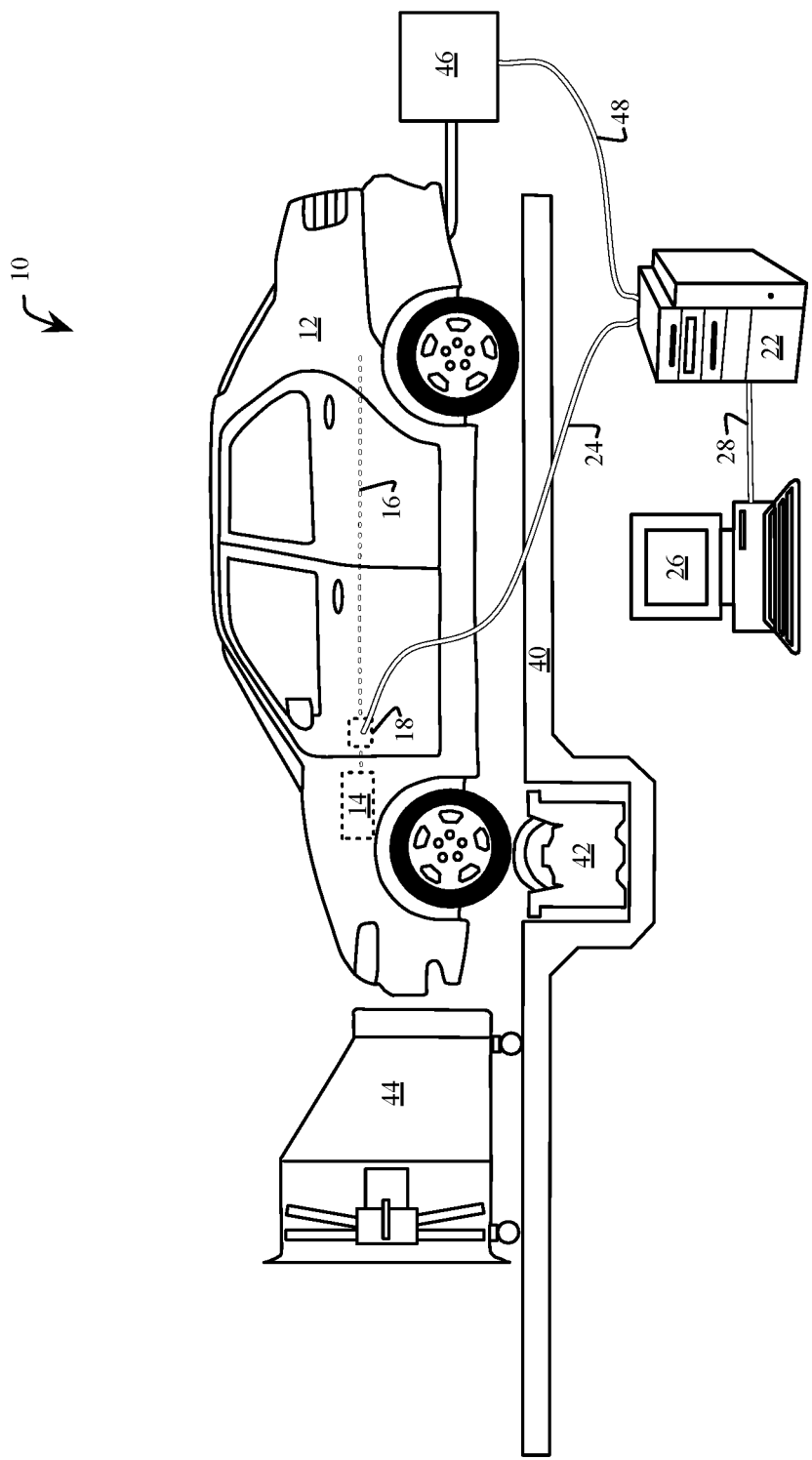
FIG. 1 is a functional block view of an embodiment of an environmental test system.

Embodiments of systems and methods described herein provide for the detection of defeat devices in at least one ECU of a vehicle. Vehicles include automobiles, motorcycles and other transportation devices that are subject to environmental testing. Permitting vehicles to operate on the road requires standardized and repeatable testing. In another embodiment, the environmental testing is used to determine a tax class for a vehicle. For example, in certain jurisdictions, vehicles with higher emissions and/or fuel consumption fall into a tax class that requires payment of a higher tax. Conversely, a repeatable test environment facilitates the use of defeat devices that recognize known patterns in the test environment (e.g., steering wheel movement). Hence, the certifying authority must test under environmental test conditions as well as emulated or actual non-environmental test conditions, and verify similar results between these two environments.

Additional hardware is added to the ECU to capture various data obtained both during an environmental test and prior to the environmental test (e.g., during "real-world" or typical consumer usage of the vehicle, such as intercity commuting, highway driving, and the like). In various embodiments, the ECU from these two environments is actively modified during the environmental test to verify similar results to the non-environmental test environment. Non-limiting examples of environmental testing include emission tests performed by, or on behalf of, a vehicle manufacturer for initial vehicle certification, emission and road safety tests performed on a periodic basis to ensure ongoing road worthiness, and fuel consumption tests. In some embodiments, wherein the vehicle includes multiple ECUs, the teachings applied to a single ECU are applied to the collective response of the multiple ECUs.

In one example of the usage of a defeat device, a urea-based exhaust after-treatment system for a diesel vehicle was activated only when the defeat device detected an environmental test condition. Outside of the test environment, the after-treatment system was deactivated to provide better performance in terms of fuel consumption, acceleration, and the like. Generally, a defeat device detects certain characteristics of a test environment, such as the movement of a steering wheel, to determine when to alter the behavior of the ECU, sensors or actuators of a vehicle. In one example, the defeat device exhibits different patterns in ECU key-data including accessed memory space, used subroutine addresses and internal states. In other examples, the defeat device alters parameters not related to memory addressing or states.

Software-based defeat devices in an ECU are very difficult to detect because the source code is typically unavailable to the tester, the code may have on the order of 100 millions lines, the software may be distributed over many parts of the ECU and various obfuscation measures may be employed. Similarly, firmware or hardware-based defeat devices do not typically lend themselves to direct discovery. In some embodiments, the defeat device is, at least partially, located in the sensor or actuator of a vehicle, with effects observed by the ECU.

A heuristic approach is disclosed herein that, in addition to other advantages, overcomes many of the obfuscation measures, operates in a practical timeframe and remains effective against many future defeat devices that continue to be adapted after discovery. A key-data collection unit is added to the ECU for the collection and comparison of the ECU data during environmental testing both under typical test environment conditions and conditions outside of the test environment (e.g., real-world). In various embodiments, the collected key-data is encrypted so that only a certifying authority can access the data. In some embodiments, the certifying authority includes the operator of the environmental tester. In other embodiments, the certifying authority is remote to the tester and obtains the test results over the Internet or a similar network. In some embodiments, the existence of the defeat device detection mechanism is disclosed to the public to deter attempts to install defeat devices.

FIG. 1 shows an embodiment 10 of an environmental test system, configured for testing emissions from a vehicle 12. The vehicle 12 includes an ECU 14. In other embodiments, the vehicle 12 includes more than one ECU 14. The ECU communicates with other sensors and actuators over a vehicle bus 16. In some embodiments, the vehicle bus 16 is one of a CAN bus, an Ethernet bus and a Flexray bus. The vehicle bus 16 includes a connection port 18 for connecting a computer 22 to the vehicle bus 16 with a connector 24 between the connection port 18 and the computer 22. The computer 22 connects to a display 26 with a connector 28. In various embodiments, the display 26 is configured to display a status flag upon detection of an anomaly. In various embodiments, the vehicle 12 rests on a test platform 40 having an embedded dynamometer 42 aligned to a driving wheel of the vehicle 12. A cooling fan 44 is placed in front of the vehicle 12 to reduce engine temperatures of the vehicle 12. An exhaust gas analyzer 46 is connected to a tail pipe of the vehicle 12, and provides gas analysis to the computer 22 over a connector 48. It should be understood that other test environments are envisioned within the scope of this disclosure without departing from the teachings of the defeat device detection.

Figure 2:
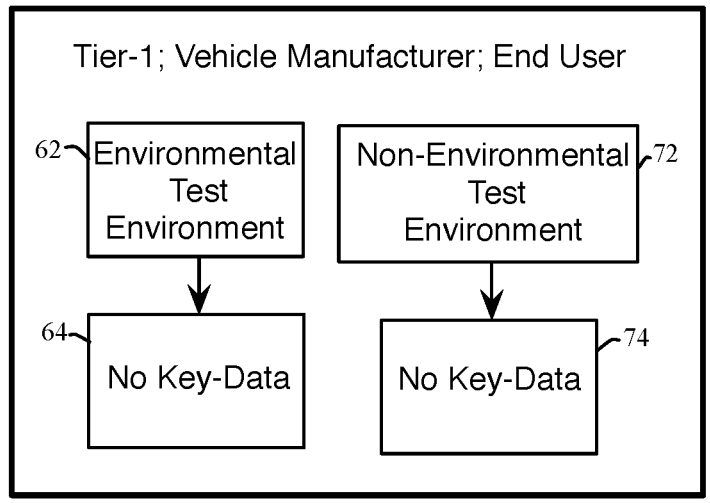
FIG. 2 is a flowchart representation of a method for environmental testing of a vehicle.
Figure 3:
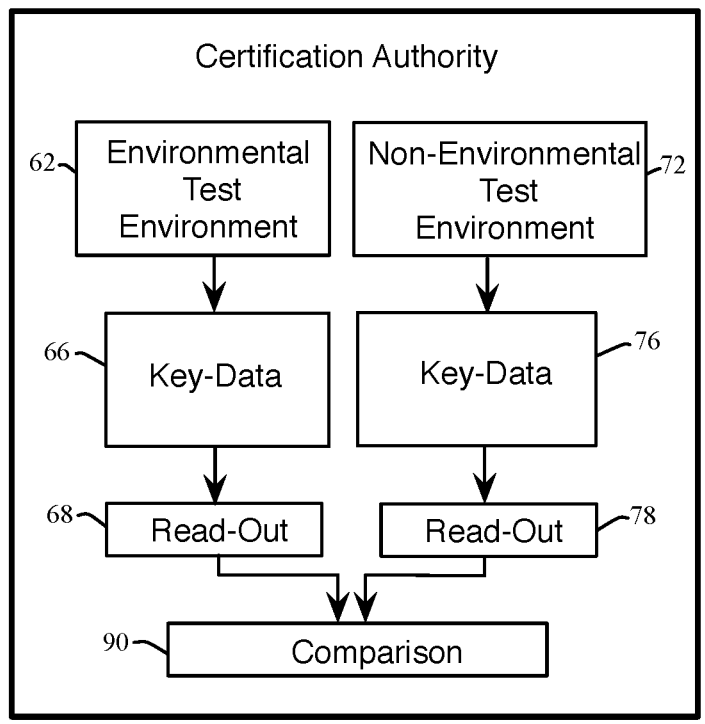
FIG. 3 is a flowchart representation of a method for environmental testing of a vehicle by comparing logged data in an environmental and non-environmental environment.

FIG. 2 shows an embodiment 60 for a Tier-1 company, a vehicle manufacturer or end user of the vehicle, where access to the key-data has not been granted. Specifically, in the environmental test environment 62, no key-data 64 is produced. Similarly, in the non-environmental test environment 72, no key-data 74 is produced. In contrast to FIG. 2, the embodiment 80 of FIG. 3 shows key-data access for a certification authority. The environmental test environment 62 produces key-data 66, which is read-out by a device 68. In some embodiments, the device 68 includes a storage device. Similarly, the non-environmental test environment 72 produces key-data 76, which is read-out by a device 78. In some embodiments, the device 78 includes a storage device. The key-data 66 and 76 are received by the respective read-out devices 68 and 78, and compared with a comparison device 90. The comparison device 90 determines an anomaly (e.g., an unexpected difference), which indicates the presence of a defeat device.

Figure 4:
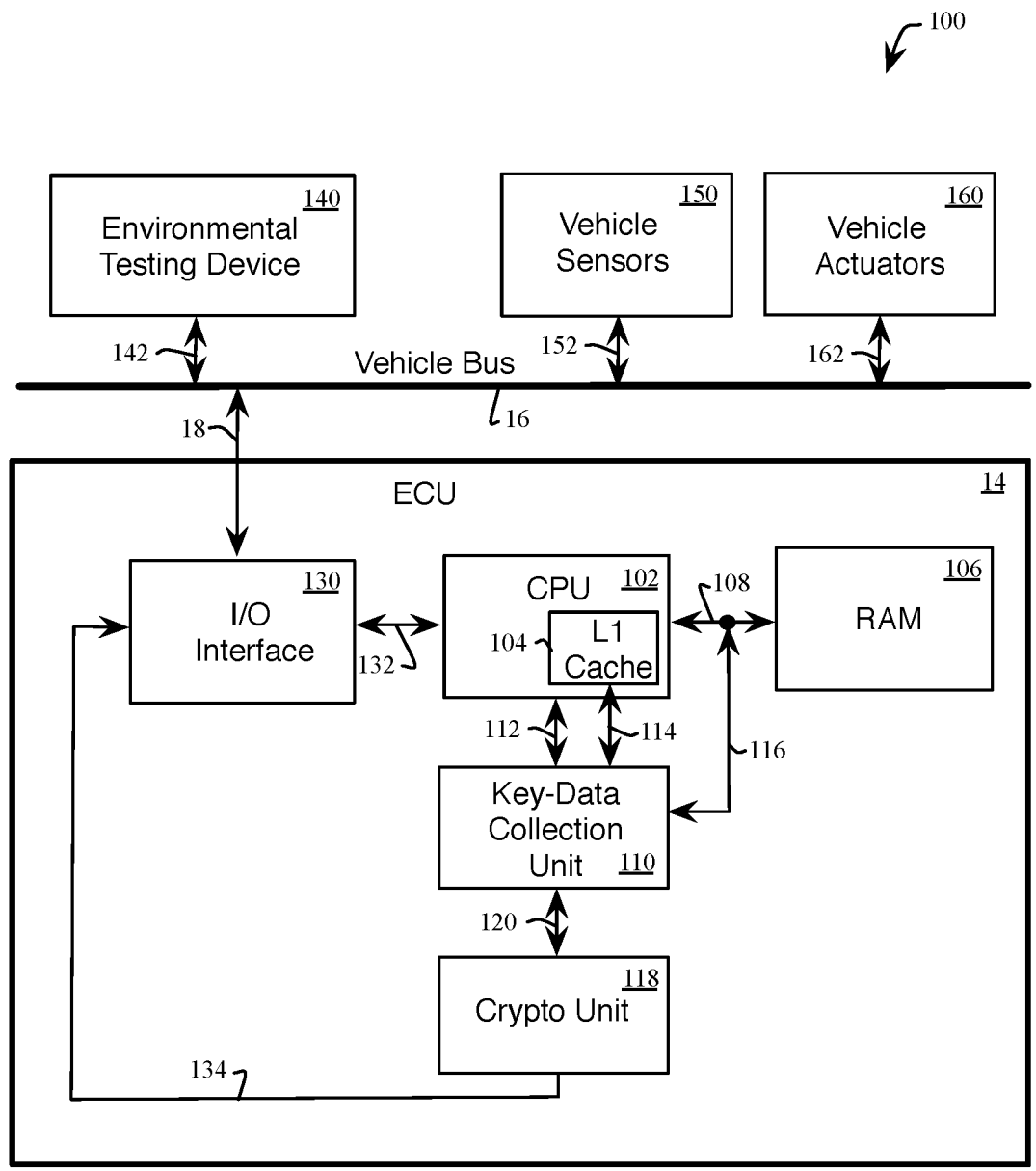
FIG. 4 is a functional block view of a system for detecting defeat devices in an ECU in accordance with an embodiment of the present disclosure.

FIG. 4, with reference to FIG. 1, shows an embodiment of a system 100 for detecting defeat devices in an ECU 14. The ECU 14 includes a Central Processing Unit (CPU) 102 including an L1 Cache. In other embodiments, multiple layers of the Cache are included. In another embodiment, the CPU is a microcontroller. The CPU 102 communicates with a Random Access Memory (RAM) 106 over a bus 108. The CPU 102 further communicates with a Key-Data Collection Unit 110 over a bus 112. The L1 cache 104 also communicates with the Key-Data Collection Unit 110 over a bus 114. The Key-Data Collection Unit 110 communicates with the bus 108 over a bus 116. In various embodiments, the Key-Data Collection Unit 110 has access to all the state information in the CPU 102, the L1 Cache 104 and the RAM 106, including look-up tables, and subroutines, through a direct transfer of data without relying on tamper-prone CPU software. In one embodiment, the Key-Data Collection Unit 110 includes storage for the collected information, wherein the storage is one of a volatile storage and a non-volatile storage. In another embodiment, the Key-Data Collection Unit 110 stores a sample of data from the CPU 102, the L1 Cache 104 and the RAM 106.

A Cryptographic (Crypto) Unit 118 encrypts data received from the Key-Data Collection Unit 110 over a bus 120. In one embodiment, the Crypto Unit 118 implements a Pretty Good Privacy (PGP) protocol for encryption. In another embodiment, another encryption methodology is used. The CPU 102 communicates with an Input/Output (I/O) Interface 130 over a bus 132. The Crypto Unit 118 communicates with the I/O Interface 130 over a bus 134. The I/O Interface 130 communicates with the Vehicle bus 16 over a bus 18.

The embodiment of the system 100 in includes an Environmental Testing Device 140 connected to the Vehicle Bus 16 over a bus 142. In one embodiment, the bus 142 connects to the Vehicle Bus 16 through the connection port 18, (shown in FIG. 1). The system 100 further includes one or more Vehicle Sensors 150 and Vehicle Actuators 160 connected to the Vehicle bus 16 though respective busses 152 and 162. An example of a Vehicle Actuator 150 is an oxygen sensor measuring oxygen levels in an exhaust manifold, or an accelerometer measuring the yaw of the vehicle 12. An example of a Vehicle Actuator 160 is a bypass valve or, in another example, a braking mechanism.

For embodiments that use PGP for encryption, the PGP keys are passed between the Crypto Unit 118 and the Environmental Testing Device 140 through the I/O Interface 130. The Environmental Testing Device 140 accesses and decrypts the Key-Data transferred by the Crypto Unit 118, and also accesses data from the Vehicle Sensors 150 and Vehicle Actuators 160 from the Vehicle Bus 16.

The Environmental Testing Device 140 analyzes collected data to find information that the Environmental Test Environment 62, (hereinafter "Test Environment"), is being treated differently than the Non-Environmental Test Environment 72, (hereinafter "Non-Test Environment"). In various embodiments, this analysis is performed with a machine-learning method based on heuristics. Based on accumulated knowledge from one or more of previous environmental test results, knowledge of the behavior of defeat devices detected thus far, and the anticipated behavior of defeat devices, characteristics of various ECU features are determined for both the Test Environment and the Non-Test Environment.

This accumulated knowledge of environmental differences is obtained from a combination of machine-learning and data supplemented by human intervention. In various embodiments, machine-learning includes estimation methods such as maximum likelihood estimation, Bayes estimator or a machine-learning-based estimator. These estimation methods determine when data positions (e.g., CPU registers, and cache contents), and time slots (e.g., an integer number of minutes after a change to the ECU status, such as being powered up), have the highest likelihood of changing the defeat device's behavior from the Test Environment to the Non-Test Environment, and vice versa.

Accordingly, in various embodiments, the Test Environment is modified by the accumulated knowledge of environmental differences such that the ECU experiences an emulated Non-Test Environment during the Environmental Test, and thus can compare the ECU behavior of the emulated Non-Test Environment to the actual Test Environment to detect differences in behavior (e.g., anomalies).

Similarly, in various embodiments, the accumulated data for the Non-Test Environment is modified by the accumulated knowledge of environmental differences such that the ECU experiences an emulated Test Environment during an Non-Test Environmental environment, and thus can compare the ECU behavior of the emulated Test Environment to the actual Non-Test Environment to detect differences in behavior (e.g., anomalies).

Throughout this disclosure, references to Key-Data refer to key metric data including, for example, the frequency and address range of memory data accessed during specific activity, correlations and patterns and the like. Characteristics of the ECU refer to such behavior as a change in intake manifold pressure of X % resulting in a change to fuel mixture of Y %, or an engine temperature varying by a certain percentage over a specific power range, for example. The term "features" refers to a specific activity such as "changing a throttle position, and the like. The term "anomaly" refers to a difference in activity from the ECU 14, Vehicle Sensors 150 and Vehicle Actuators 160 that result in a significant difference in the key-data during an environmental test and before an environmental test (e.g., "real-world" behavior).

In various embodiments, the acquisition of accumulated knowledge of environmental differences through machine-learning is further augmented with one or more of the techniques described below, or any combination thereof. In one embodiment, a machine-learning algorithm starts with pre-processing or data reduction of the large amount of data (e.g., identifying constant values and identifying constantly changing values). For example, driving speed is usually slowly changing with respect to the small sample intervals, thus it can be expressed by a step-wise linear function instead of a large number of sample points.

In one embodiment, a machine-learning algorithm usually requires feature extraction, which can be augmented by human assistance to achieve improved speeds. For example, the feature extraction might focus on a non-linear behavior. A defeat device might react to small or large movements of the steering wheel in the same way. By noticing that the steering wheel is active, the defeat device might conclude that it is not in the environmental test mode. Without the defeat device, the ECU might not react to the steering wheel movement at all, or if the defeat device does react the reaction for small movements would be different that the reaction to large movements.

In one embodiment, the machine-learning algorithm is augmented by human input that informs the algorithm which input data are more likely to determine a difference between the test environment and non-test environment, and which environment is more likely. For example, the behavior of defeat devices is often time dependent. In one example, after an integer number of minutes following the start of the engine, (and activation of the ECU), the defeat device modifies the exhaust after-treatment procedure. Such time dependencies often occur after an integer number of minutes (e.g., exactly 23 minutes to 23.01 minutes after engine start). In other example embodiments, a critical test is altered after an integer number of minutes following another relevant change to the status of the ECU. In other embodiments, the defeat device changes the status of a Vehicle Actuator 160 independent of a change to the Vehicle Sensors 150.

In one embodiment, the machine-learning algorithm creates certain environmental test scenarios, which makes it easier for the algorithm to learn the differences between an environmental test and a non-environmental test. Creating these scenarios is based on the input data captured during previous measurements runs—for example, repeating a lab run with slightly different input conditions, with a modified sequence of test, or repeating tests.

In various embodiments, defeat devices exist in the ECU prior to the initial manufacturing certification, during period technical inspections, or both. During the periodic technical inspections, certain inspection authorities upload new firmware to the ECU. This firmware needs to be delivered and cryptographically signed by the car manufacturer. Only firmware with the right signature will be accepted by the ECU. In various embodiments, checking for defeat devices during period inspections includes comparing key-data determined before the firmware upload to key-data determined after the firmware upload. In various embodiments, the ECU data is not only read, but also written to, (for example, the Certifying Authority can write or modify data in the CPU registers, L1-Cache or RAM).

In various embodiments, the machine-learning algorithm gets information from humans about the general behavior of the car environment. For example, increasing fuel injection increases engine power, or increasing the air fraction leads to more NOx and less CO in the exhaust gas.

In various embodiments, the machine-learning algorithm gets information from humans about typical time constants of the car environment. For example, increasing fuel injection or decreasing the cooling of the engine leads to increasing engine temperature with a time constant within a certain time range measured in minutes or modifying the fuel/air ratio leads to modified exhaust gas contents with certain time constants (e.g., within 100 ms).

In various embodiments, the machine-learning algorithm is based upon "hidden" parameters that are not directly measured, but that are good intermediate values to be used by a deep learning algorithm. Examples include the speed with which the fuel is injected into the combustion chamber, or the temperature inside the combustion chamber.

In various embodiments, the machine-learning algorithm receives guidance regarding data clustering (e.g., without a defeat device, the data in the L1 cache are expected to be more constant than those in CPU registers, or the size of engine characteristic maps is a certain size).

In another example embodiment, a defeat device is detected by the use of different subroutines for the same feature, where the subroutine controls some parameters of the engine or exhaust gas treatment unit. In another example embodiment, the defeat device sets a parameter in the same subroutine to zero for the test environment and to one for the non-test environment. In another embodiment, the defeat device changes a parity of a random number in a subroutine to always be an odd number for the test environment and an even number for a non-test environment.

In another example embodiment, access to suspect subroutines or lookup tables occurs immediately after reading out a respective sensor (e.g., exhaust temperature), or immediately before controlling a respective actuator (e.g., fuel injection or a catalyst).

In various embodiments, the defeat device changes its response to the feature based on an indication of being in the test environment (or conversely the non-test environment). Illustrative non-limiting example conditions of a test environment include in extreme cases, the steering wheel not moving, the front wheels not turning, the speed staying constant for several minutes, the speed changing abruptly, outside parameters such as air temperature staying substantially constant, and a reduced cooling capacity of the cooling system due to lack of head winds resulting in a faster rise in engine temperature and thus fuel consumption.

Figure 5:
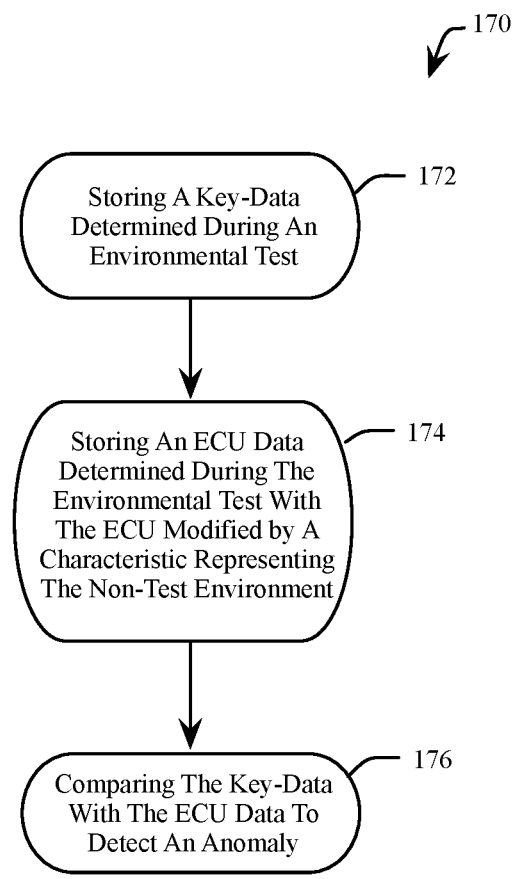
FIG. 5 is a flowchart representation of a method for detecting defeat devices in an ECU in accordance with an embodiment of the present disclosure.

FIG. 5 describes an embodiment of a method for detecting defeat devices by causing the ECU to react as if it is in the non-test environment, while actually in the test environment. If the ECU response changes, a defeat device is likely present. At 172, a key-data determined during an environmental test is stored by the key-data collection unit 110. At 174, the ECU is modified with a characteristic, such that the ECU senses the non-test environment. In various embodiments, the characteristic is written to the ECU by the Environmental Testing Device 140. ECU data is then stored in the key-data collection unit 110 as ECU data. A comparison at 176 of the key-data and the ECU data will indicate the presence of a defeat device, if there is a difference in the comparison (e.g., an anomaly). The anomaly indicates the presence of a defeat device because the ECU should otherwise produce similar key-data with the same stimulus regardless of whether the ECU is in the test environment or not. Key-data is considered to be "similar" when changes are due merely to uncontrollable random variations or the input data and internal states. In one embodiment, a level of these random variations is predetermined by adding a threshold value below which a pair of key-data is considered to be similar.

Figure 6:
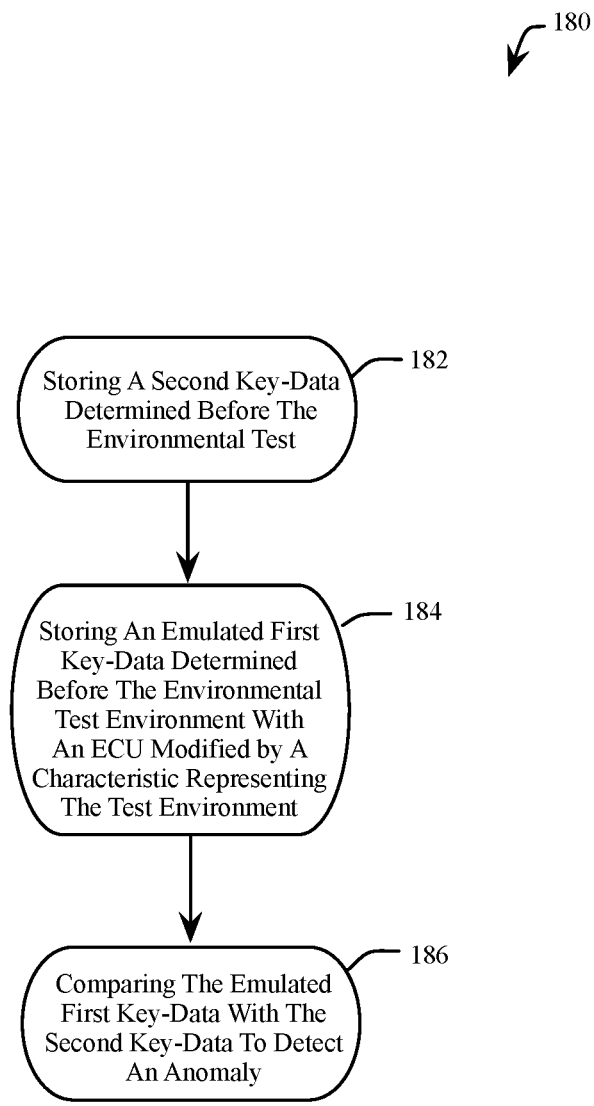
FIG. 6 is a flowchart representation of a method for detecting defeat devices in an ECU in accordance with an embodiment of the present disclosure.

FIG. 6 describes an embodiment of a method for detecting defeat devices by causing the ECU to react as if it is in the test environment, while actually in the non-test environment. At 182, a second key-data determined before the environment test (e.g., non-test environment). At 184, the ECU is modified with a characteristic, such that the ECU senses the test environment. ECU data is then stored in the key-data collection unit 110 as an emulated first key-data, while in the non-test environment. At 186, the emulated first-key data is compared with the second key data to detect an anomaly indicting the presence of a defeat device.

Figure 7:
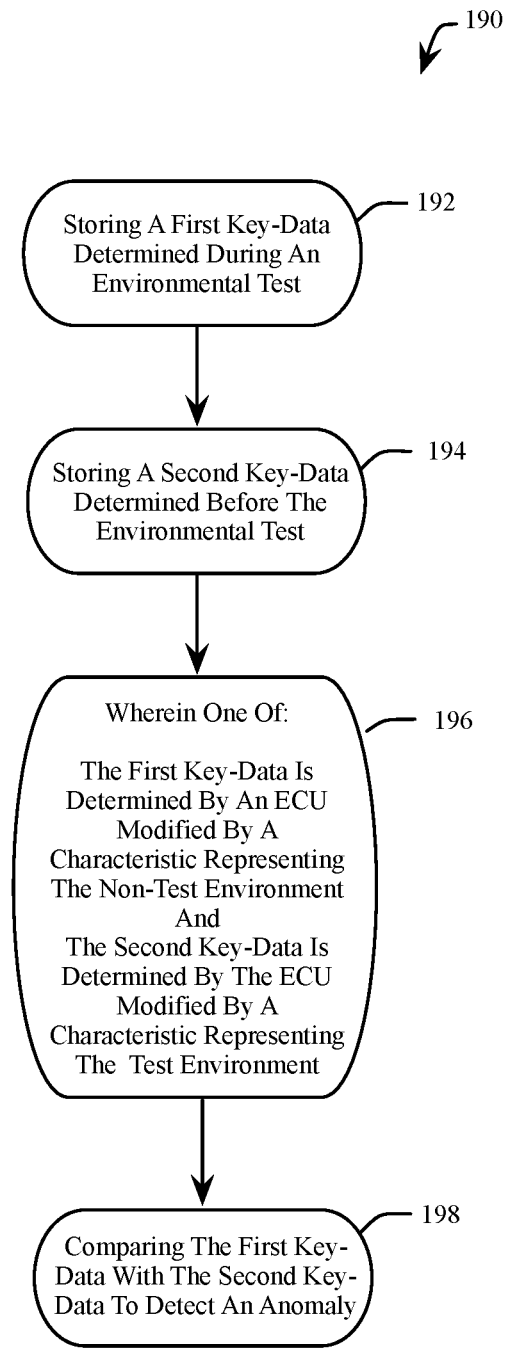
FIG. 7 is a flowchart representation of a method for detecting defeat devices in an ECU in accordance with an embodiment of the present disclosure.

FIG. 7 describes an embodiment of a method for detecting defeat devices caused either by modifying the ECU with a characteristic to sense that the ECU is in the non-test environment, while in the test environment, or vice versa. At 192, a first key-data is determined during an environmental test. At 194, a second key-data is determined before the environmental test (e.g., the non-test environment). At 196, either the first key-data is determined at 192 is determined by an ECU sensing a non-test environment or the second key-data is determined at 194 by the ECU sensing a test environment. At 198, the first key-data is compared with the second key-data to detect an anomaly.

As will be appreciated, embodiments as disclosed include at least the following. In one embodiment, a method for detecting defeat devices in an engine control unit (ECU) comprises storing with a key-data collection unit, a key-data determined during an environmental test of a first vehicle. The key-data collection unit stores an ECU data determined during the environmental test by the ECU modified by a characteristic, the characteristic is only present before a previous environmental test of a second vehicle, wherein the first vehicle and the second vehicle are a same type of vehicle. The environmental testing device compares the key-data with the ECU data to detect an anomaly, wherein the anomaly indicates the presence of the defeat device in the ECU.

Alternative embodiments of the method for detecting defeat devices in an engine control unit include one of the following features, or any combination thereof. The key-data and the ECU data are encrypted to form an encrypted key-data-set, the key-data-set is transmitted to the environmental testing device, and the encrypted key-data-set is decrypted with the environmental testing device. The first vehicle and the second vehicle are a same vehicle. The characteristic is determined by comparing a feature of the first vehicle during the environmental test to the feature during a plurality of environmental and driving conditions performed on the second vehicle before the environmental test. The environmental test is one of an emissions test and a fuel consumption test. A status flag is set with the emissions testing device to report the detection of the anomaly.

In another embodiment, a method for detecting defeat devices in an engine control unit (ECU) comprises storing with a key-data collection unit, a second key-data determined before an environmental test of a vehicle. The key-data collection unit stores an emulated first key-data determined before the environmental test by the ECU modified by a characteristic only present during the environmental test. An environmental testing device compares the emulated first key-data to the second key data to detect an anomaly, wherein the anomaly indicates the presence of the defeat device in the ECU.

Alternative embodiments of the method for detecting defeat devices in an engine control unit include one of the following features, or any combination thereof. The anomaly is reported by setting a status flag in the environmental testing device. Comparing the first key-data to the second key-data further comprises pre-processing the second key-data with the environmental testing device to categorize the second key-data into a constant value set and a changing value set, wherein the changing value set includes a time-variant data having a magnitude that exceeds a threshold during a time period. A step-wise linear function is determined for a plurality of values in the changing value set. A feature is determined in common with the first key-data and the second key-data, and the anomaly is determined in response a first ECU response to a change to the feature in the first key-data being different than a second ECU response to the change to the feature in the second key-data. Detecting the anomaly further comprises determining an actuator change to a vehicle actuator, correlated less than to a pre-set value, to a sensor change to a vehicle sensor, the vehicle actuator is configured to actuate a device connected to the vehicle in response to an actuator command from the ECU, wherein the actuator command is responsive to the sensor change. The change to the vehicle actuator occurs at an integer number of minutes following a change to a status of the ECU. The actuator command for the first key-data is stored in a different memory location in the ECU than the actuator command for the second key-data. The determination of the first key-data includes averaging data from a plurality of the environmental tests, wherein each environmental test includes a plurality of measurement runs, and each environmental test is performed with at least one of a different sequence of the measurement runs and different input conditions to the environmental testing device. A first comparison of the first key-data to the second key-data is generated before uploading a firmware update to the ECU, and a second comparison of the first key-data to the second key-data is generated after uploading the firmware update to the ECU, the anomaly is determined by a difference between the first comparison and the second comparison. The second key-data is reduced through sampling, before storing the second key-data in the key-data collection unit.

In another embodiment, a method for detecting defeat devices in an engine control unit (ECU) comprises storing with a key-data collection unit, a first key-data determined during an environmental test of a vehicle. The key-data collection unit stores a second key-data determined before the environmental test. Wherein one of the first key-data is determined by the ECU modified by a characteristic only present before the environmental test and the second key-data is determined by the ECU modified by a characteristic only present during the environmental test. An environmental testing device compares the first key-data with the second key-data to detect an anomaly, wherein the anomaly indicates the presence of the defeat device in the ECU.

Alternative embodiments of the method for detecting defeat devices in an engine control unit include one of the following features, or any combination thereof. Comparing the first key-data to the second key-data further comprises pre-processing the second key-data with the emissions testing device to categorize the second key-data into a constant value set and a changing value set, wherein the changing value set includes a time-variant data having a magnitude that exceeds a threshold during a time period, and determining a step-wise linear function for a plurality of values in the changing value set. Detecting the anomaly further comprises determining an actuator change to a vehicle actuator, correlated less than to a pre-set value, to a sensor change to a vehicle sensor, the vehicle actuator configured to actuate a device connected to the vehicle in response to an actuator command from the ECU, wherein the actuator command is responsive to the sensor change, and the change to the vehicle actuator occurring at an integer number of minutes following a change to a status of the ECU.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting defeat devices in an engine control unit (ECU) comprising:
    storing, with a key-data collection unit, a key-data determined during an environmental test of a first vehicle;
    storing, with the key-data collection unit, an ECU data determined during the environmental test by the ECU modified by a characteristic, the characteristic only present before a previous environmental test of a second vehicle, wherein the first vehicle and the second vehicle are a same type of vehicle; and
    comparing, with an environmental testing device, the key-data with the ECU data to detect an anomaly, wherein the anomaly indicates the presence of the defeat device in the ECU.

2. The method of claim 1 further comprising encrypting the key-data and the ECU data to form an encrypted key-data-set, transmitting the key-data-set to the environmental testing device, and decrypting the encrypted key-data-set with the environmental testing device.

3. The method of claim 1 wherein the first vehicle and the second vehicle are a same vehicle.

4. The method of claim 1 wherein the characteristic is determined by comparing a feature of the first vehicle during the environmental test to the feature during a plurality of environmental and driving conditions performed on the second vehicle before the environmental test.

5. The method of claim 1 wherein the environmental test is one of an emissions test and a fuel consumption test.

6. The method of claim 1 further comprising setting a status flag with the emissions testing device to report the detection of the anomaly.

7. A method for detecting defeat devices in an engine control unit (ECU) comprising:
    storing with a key-data collection unit, a second key-data determined before an environmental test of a vehicle;
    storing with the key-data collection unit, a emulated first key-data determined before the environmental test by the ECU modified by a characteristic only present during the environmental test; and
    comparing, with an environmental testing device, the emulated first key-data to the second key data to detect an anomaly, wherein the anomaly indicates the presence of the defeat device in the ECU.

8. The method of claim 7 further comprising reporting the anomaly by setting a status flag in the environmental testing device.

9. The method of claim 7 further comprising determining a feature in common with the first key-data and the second key-data, and determining the anomaly in response a first ECU response to a change to the feature in the first key-data being different than a second ECU response to the change to the feature in the second key-data.

10. The method of claim 7 wherein the determination of the first key-data includes averaging data from a plurality of the environmental tests, wherein each environmental test includes a plurality of measurement runs, and each environmental test is performed with at least one of a different sequence of the measurement runs and different input conditions to the environmental testing device.

11. The method of claim 7 further comprising generating a first comparison of the first key-data to the second key-data before uploading a firmware update to the ECU, and generating a second comparison of the first key-data to the second key-data after uploading the firmware update to the ECU, the anomaly determined by a difference between the first comparison and the second comparison.

12. The method of claim 7 further comprising reducing the second key-data through sampling, before storing the second key-data in the key-data collection unit.

13. The method of claim 7 wherein comparing the first key-data to the second key-data further comprises pre-processing the second key-data with the environmental testing device to categorize the second key-data into a constant value set and a changing value set, wherein the changing value set includes a time-variant data having a magnitude that exceeds a threshold during a time period.

14. The method of claim 13 further comprising determining a step-wise linear function for a plurality of values in the changing value set.

15. The method of claim 7 wherein detecting the anomaly further comprises determining an actuator change to a vehicle actuator, correlated less than to a pre-set value, to a sensor change to a vehicle sensor, the vehicle actuator configured to actuate a device connected to the vehicle in response to an actuator command from the ECU, wherein the actuator command is responsive to the sensor change.

16. The method of claim 15 wherein the change to the vehicle actuator occurs at an integer number of minutes following a change to a status of the ECU.

17. The method of claim 15 wherein the actuator command for the first key-data is stored in a different memory location in the ECU than the actuator command for the second key-data.

18. A method for detecting defeat devices in an engine control unit (ECU) comprising:
storing with a key-data collection unit, a first key-data determined during an environmental test of a vehicle;
storing with the key-data collection unit, a second key-data determined before the environmental test; wherein one of the first key-data is determined by the ECU modified by a characteristic only present before the environmental test and the second key-data is determined by the ECU modified by a characteristic only present during the environmental test; and
comparing, with an environmental testing device, the first key-data with the second key-data to detect an anomaly, wherein the anomaly indicates the presence of the defeat device in the ECU.

19. The method of claim 18 wherein comparing the first key-data to the second key-data further comprises pre-processing the second key-data with the emissions testing device to categorize the second key-data into a constant value set and a changing value set, wherein the changing value set includes a time-variant data having a magnitude that exceeds a threshold during a time period, and determining a step-wise linear function for a plurality of values in the changing value set.

20. The method of claim 18 wherein detecting the anomaly further comprises determining an actuator change to a vehicle actuator, correlated less than to a pre-set value, to a sensor change to a vehicle sensor, the vehicle actuator configured to actuate a device connected to the vehicle in response to an actuator command from the ECU, wherein the actuator command is responsive to the sensor change, and the change to the vehicle actuator occurring at an integer number of minutes following a change to a status of the ECU.

\* \* \* \* \*